United States Patent

[11] 3,596,638

[72] Inventor Rupprecht Michel
Erlangen, Germany
[21] Appl. No. 767,750
[22] Filed Oct. 15, 1968
[45] Patented Aug. 3, 1971
[73] Assignee Siemens Aktiengesellschaft
Berlin, Germany

[54] FORCED-FLOW STEAM GENERATOR TO BE HEATED BY PRESSURIZED COOLANT OF A NUCLEAR REACTOR
6 Claims, 2 Drawing Figs.

[52] U.S. Cl. .................................................. 122/32, 165/82
[51] Int. Cl. .................................................. F22b 1/06
[50] Field of Search .......................................... 122/33, 32; 165/81, 82, 83

[56] References Cited
UNITED STATES PATENTS

| | | | |
|---|---|---|---|
| 2,670,185 | 2/1954 | Schorner et al. | 165/83 X |
| 3,162,177 | 12/1964 | Loew et al. | 165/81 X |
| 3,247,897 | 4/1966 | Ammon | 165/81 |
| 3,447,509 | 6/1969 | Sprague | 122/32 |

FOREIGN PATENTS

| | | | |
|---|---|---|---|
| 1,286,722 | 1/1962 | France | 165/83 |
| 366,849 | 2/1932 | Great Britain | 165/83 |

*Primary Examiner*—Kenneth W. Sprague
*Attorneys*—Curt M. Avery, Arthur E. Wilfond, Herbert L. Lerner and Daniel J. Tick ABSTRACT: A forced-flow steam generator which is to be heated by pressurized water or other nuclear-reactor pressurized coolant comprises a vertically elongated heat exchanger whose pressure-resistant vessel structure encloses a system of vertically parallel tubes which extend from a plenum chamber at the vessel bottom upwardly to a plenum chamber at the vessel top. The tubes are all straight and have no mixing points between the two plenum chambers. At least one of the two structures that form the respective plenum chambers is movably connected with the wall structure of the heat exchanger vessel to permit a heat-responsive movement. Preferably one of the conduits entering into the vessel to communicate with one of the plenum chambers is joined with an outlet of the chamber by a movable or overlapping joint which is sealed by means of an expansible diaphragm such as a corrugated sealing tube.

FORCED-FLOW STEAM GENERATOR TO BE HEATED BY PRESSURIZED COOLANT OF A NUCLEAR REACTOR

My invention relates to a steam generator of the forced-flow or once-through type which is heated by the pressurized water or other pressurized reactor coolant. Generally, the conventional steam generators joined with pressurized reactors in nuclear power plants are equipped with U-shaped bunches of tubes welded into the common base plate together with a separating sheet structure. This type of steam generator produces a more or less wet steam, depending upon the quality of the water separator equipment connected to the outlet of the steam generator proper.

It has become known to design forced-flow steam generators on the counterflow principle and capable of producing superheated steam. These generators are equipped with bunches of straight and parallel tubes which are welded into fixed top and bottom plates. Generators of this type also leave much to be desired, particularly because there occur expansion problems of the tube system relative to the external vessel wall structure, especially during startingup operations.

It is an object of my invention, therefore, to devise a forced-flow steam generator for operation with pressurized water or other nuclear reactor pressurized coolant that is not only capable of producing superheated steam but also avoids the difficulties heretofore encountered by the difference in expansion between the system of heat-exchanger tubes and the vessel or boiler wall structure.

A further object of my invention is to facilitate any necessary cleaning of the generator tubes, particularly in comparison with the difficulties encountered in this respect with the U-shaped bunches of tubes used in known steam generators. Another object akin to the one last-mentioned is to considerably facilitate rendering the interior of the steam generators accessible to maintenance personnel so as to permit from time to time an inspection of the tube system and the sealing of any leakage localities that may be discovered.

To achieve these objects and in accordance with a feature of my invention, I provide the vessel structure of a forced-flow steam generator with vertically arranged parallel tubes extending between a plenum chamber at the bottom upwardly to a plenum chamber at the top of the heat exchanger without any intermediate junction or mixing localities, and I provide for displaceability of at least one of the two chamber structures relative to the fixed wall structure of the generator vessel in response to any differences in thermal expansion or contraction.

The displaceable chamber structure, herein designated as a "head," is joined by welding with all of the individual tubes that extend vertically through the heat exchanger and is preferably located at the top of the vessel. The steam or the pressurized water is conducted out of the displaceable head through ducts or the like which are displaceably sealed relative to the vessel interior with the aid of an expansible diaphragm seal such as a corrugated ring or tube structure.

There are fundamentally two ways of designing and using such a steam generator. One of these is to pass the pressurized water through the tube system so that the steam is generated within the generator vessel around and outside of the heating tubes. In this case a relatively small wall thickness of the vessel is sufficient because the generated steam may have a pressure for example, of 50 atm. (superatmospheric). A second way is to generate the steam in the interior of the system tubes and to pass the pressurized water outside of the tubes through the generator vessel. Since the operating pressure of the pressurized water is generally high, for example 150 atm., a correspondingly larger wall thickness of the generator vessel is then needed.

The invention will be further described with reference to the drawings showing two embodiments of forced-flow steam generators according to the invention by way of example in a schematic and simplified representation.

In both embodiments a fixed plate structure is provided in the bottom portion of the heat exchanger, and a displaceable head is provided in the top portion. Of course, the displaceable plate may also be located in the bottom portion, or both plates may be made displaceable in the manner illustrated and presently described for one of them.

Figure 1:
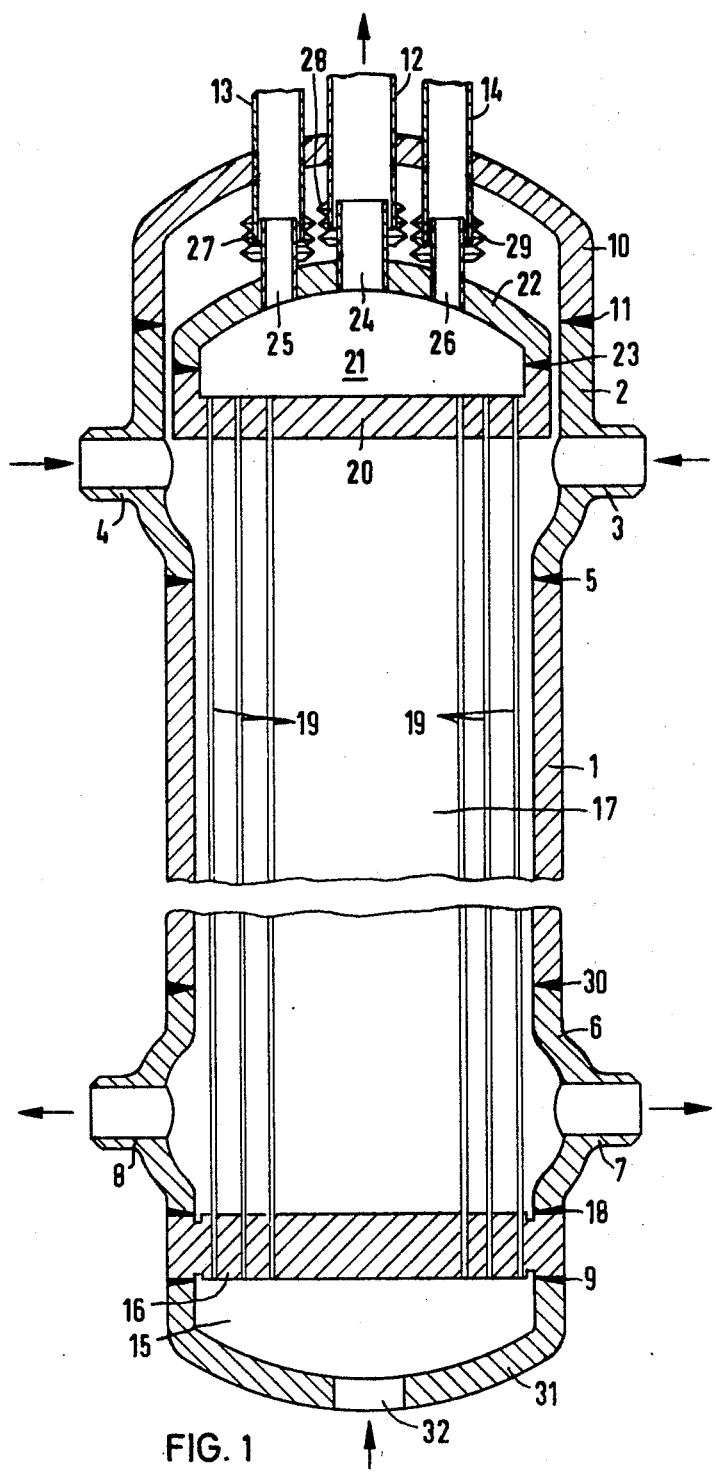
FIG. 1 illustrates an embodiment in which the steam is generated in the interior of the system tubes and the pressurized water passes through the vessel only outside of the tubes in counterflow to the flow of water and steam occurring in the tubes.

The steam generator illustrated in FIG. 1 is essentially a heat exchanger of a greatly elongated and essentially cylindrical shape and which is vertically arranged when mounted. The tubular vessel wall 1 carries at its top end an annular body 2 provided with tubular inlet conduits 3 and 4. The portion 2 is welded to the portion 1 by a welding seam located at 5. The inlets 3 and 4 serve to permit supplying the heating medium such as pressurized water from a nuclear reactor.

In a similar manner, the bottom end of the tubular wall structure 1 is coaxially joined by welding at 30 with an annular body 6 which has outlet ducts 7 and 8. A bottom cap 31 is welded to the vessel structure at 9 and is provided with a centrally located inlet opening 32 through which the water to be evaporated is to be supplied. Accordingly an upper cover cap 10 is welded to the upper ring structure 2 at 11. The generated steam passes through one or several outlet conduits from the interior of the top cap 10 to the outside of the generator. In the illustrated embodiment, the steam outlet ducts or conduits comprise a central conduit 12 of relatively large diameter and outer conduits 13 and 14 of smaller diameter. Preferably, the central conduit 12 is given such a large cross section as to permit access to the upper plate 20. For example, the diameter of the central conduit 12 should be such that a maintenance person can enter into the plenum chamber 21 located within the collector structure above the plate 20. This permits maintenance personnel to check the individual parallel tubes 19 and if necessary to repair the tubes or their junctions. Analogously, the inlet duct or opening 32 in the bottom cap 31 can be kept large enough to permit a person to have access to the plenum chamber 15 formed within the bottom cap which in this embodiment constitutes the distributor conjointly with the bottom plate 16. In lieu thereof, a manhole may be provided in the bottom cap 31.

The working medium to be converted to steam passes through the inlet 32 into the distributor plenum chamber 15 which is sealed against the inner spaces 17 of the generator vessel by means of the bottom plate 16. The bottom plate 16 is tightly sealed to the ring structure 6 by welding at the locality 18. The individual tubes 19 extend in parallel relation to each other and straight vertically to the upper plate 20.

The length of the individual tubes 19, for example, may be 19 m. When employing tubes having an inner diameter of 12 mm. and an outer diameter of 16 mm., the total number of the parallel tubes may amount to 12,800, for example. This tube system can be accommodated in the vessel structure 1 having a diameter of somewhat more than 3 m. and having a height of somewhat more than 22 m.

The plate 20 which forms part of the collector structure and confines the collector structure and confines the collector plenum chamber 21, is not fixedly connected with the wall structure of the vessel but is displaceable within the vessel. The collector structure formed by parts 20 and 22 is mounted in the top portion of the steam generator by means of the steam outlet ducts 24, 25 and 26, which are coaxially joined with respective outlet conduits 12, 13 and 14 through respective diaphragm tubes or rings 28, 27 and 29 constituted in this embodiment by expansible and contractable bellows of corrugated tubular material. The outlet conduits 12, 13 and 14 extend through the top cap 10 to the outside of the steam generator. I have found it generally advantageous to dimension the flow cross secton and length as well as the number of the tubes 19 so that under the given operating conditions the water entering into the tubes 19 does not exceed a speed of 0.05 m./sec under the full load operation. Since the tubes are traversed in the upward direction by the working medium, this relatively small flow speed results in a sufficient self-stabilization with respect to the distribution of the water onto the numerous parallel paths on account of the static pressure difference. At the preferred low flow speed, there is obtained the reasonable assurance that approximately the same superheated state of the steam is attained at the outlet openings of all parallel tubes.

It will be recognized that in a tube generator according to the invention, the individual tubes of the system or bunch are all straight and vertical, in contrast to the conventional helically bent or otherwise curved tubes. By virtue of this difference in conjunction with the yielding mounting of at least one of the two end plates, (20,16), the occurrence of thermal tensions in the heat exchanger due to differences in expansion of the individual components, is prevented. Furthermore, the invention achieves the advantage, in comparison with curved bunches of tubes, that any necessary cleaning of the tubes is greatly facilitated. By taking care of having the distributor and collector, or at least one of these two components, accessible from the outside, there is afforded the possibility of checking the tube system from time to time after any desired periods of operation, so that any discovered leakage localities can be repaired. For uniformly distributing the heat-supplying medium, the evaporator tubes may be provided with branches at the inlet and outlet, for example, a quadruple branching, so that an enlarged free cross section is available for the inflow and outflow of the pressurized water in the radial direction.

Figure 2:
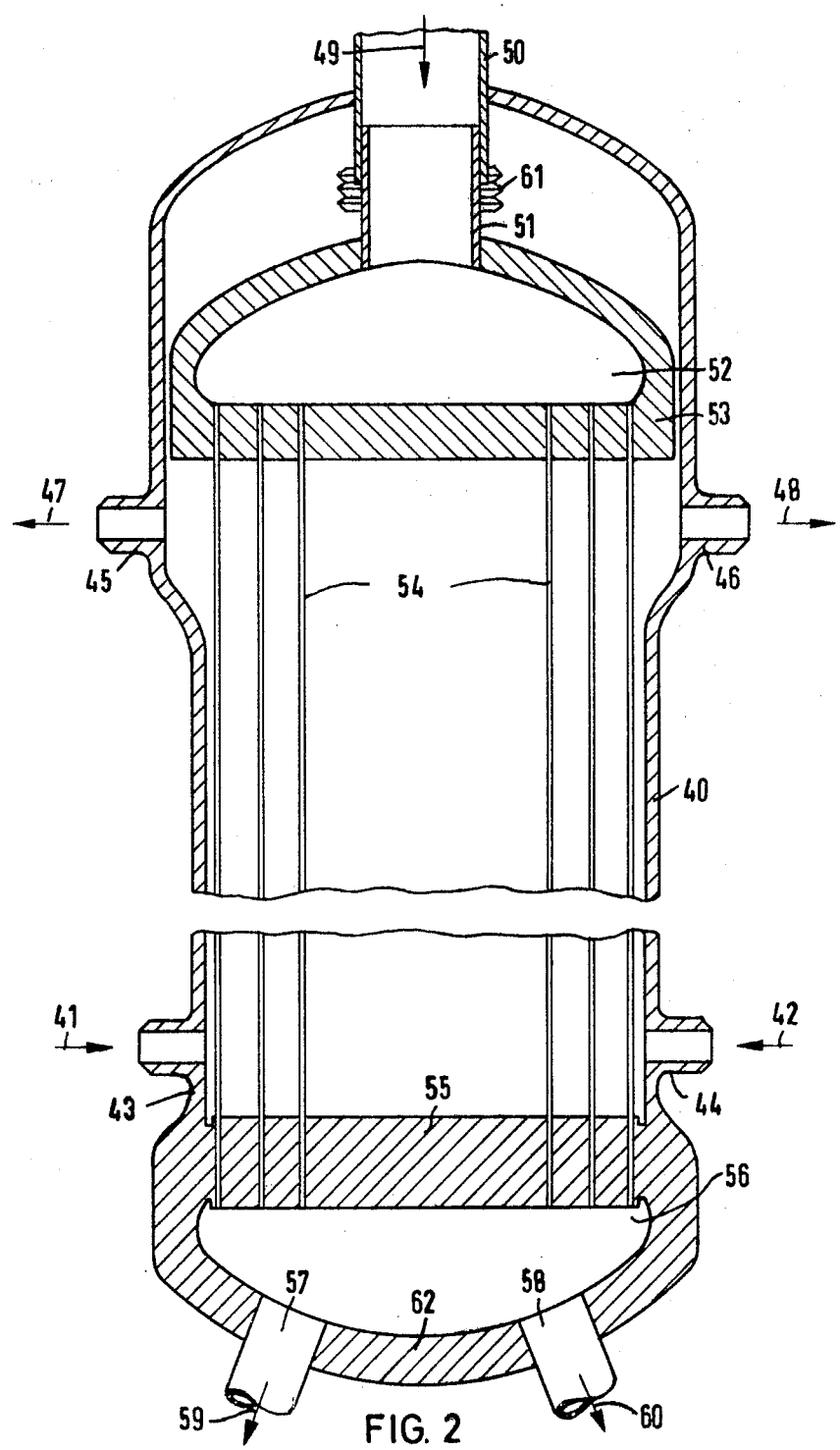
FIG. 2 shows in vertical section an embodiment in which the pressurized water passes through the interior of the system or bunch of parallel tubes.

In the embodiment illustrated in FIG. 2, the heat-supplying pressurized water passes through the interior of the system tubes. This has the advantage that the inner wall of the entire generator vessel need no longer be clad austenitically, but that such protective measure need be applied only to the distributor and collector heads. The jacket portion 40 of the heat exchanger, in contrast to the one shown in FIG. 1, is given a correspondingly smaller wall thickness, this thickness depending upon the pressure of the steam to be generated, amounting for example to 50 atm.

The working medium to be evaporated enters in the direction of the arrows 41 and 42 into the inlet conduits 43 and 44. It leaves in the form of superheated steam from the outlet conduits 45 and 46 in the direction of the arrows 47 and 48. The heat-supplying pressurized water flows in the direction of the arrow 49 into the inlet conduit 50 and passes through the duct 51 into the collector plenum chamber 52 located above the upper plate 53 which is displaceable relative to the vessel structure 40 in the vertical direction in response to thermal expansion or contraction. The pressurized water then passes through the parallel tubes 54 of which the illustration shows only a few for the sake of clarity. The bottom ends of the many tubes 54 are secured to a bottom plate 55 which is firmly welded or otherwise made integral with the vessel structure. From the collector chamber 56 thus formed in the bottom portion of the generator, the water leaves the vessel through outlet conduits 57 and 58 in the direction of the arrows 59 and 60. Shown at 61 is a diaphragm seal in the form of a corrugated tube to provide for the necessary seal. It will be understood that other sealing devices or stuffing boxes may be used instead.

As explained with reference to FIG. 1, at least one of the inlet and outlet conduits is preferably given a sufficiently large cross section to permit the distributor plenum chamber 52 or the collector chamber 56 or both to be entered by a person for maintenance purposes. If desired, a manhole may instead be provided in the bottom cap 62.

To those skilled in the art, it will be obvious upon a study of this disclosure that my invention permits of various other modifications and hence may be given embodiments other than those particularly illustrated and described herein, without departing from the essential features of the invention and within the scope of the claims annexed hereto.

I claim:

1. A forced-flow steam generator adapted to be heated by pressurized water or other nuclear reactor pressurized coolant, comprising elongated and vertically arranged heat exchanger means having a system of parallel straight heat exchanger tubes and a vessel having a pressure-resistant wall structure enclosing said tube system, plenum chamber means in the top portion of said vessel thermally displaceable relative to said vessel, plenum chamber means in the bottom portion of said vessel tightly affixed to said vessel, said individual tubes extending straight vertically and free of mixing localities between said two chamber means so as to form respective communications between said two plenum chambers, said vessel having inlet and outlet ducts communicating through respective chambers with said tubes, said inlet and outlet ducts including an inlet duct tightly affixed to said vessel, said vessel having further inlet and outlet means defining a flow path exteriorly of said tubes through said vessel; movable packing means providing a seal between said inlet duct and one of said plenum chamber means; thermally responsive means movably connecting at least one of said chamber means with said vessel wall structure; and access means in said vessel for providing access for a man to at least one of said chamber means.

2. In a forced-flow steam generator according to claim 1, said thermally responsive means comprising a conduit communicating with one of said ducts in coaxial and coaxially displaceable relation thereto, said conduit extending from within said vessel to the outside thereof.

3. In a steam generator according to claim 2, said thermally responsive means comprising a tubular corrugated sealing member coaxially surrounding and sealing said duct and said conduit at the mutually adjacent ends thereof.

4. In a forced-flow steam generator according to claim 1, said system of tubes being rated for 0.5 m./sec maximum speed of the entering water at full load.

5. In a forced-flow steam generator according to claim 1, at least one of said inlet and outlet ducts having a diameter large enough for a person to pass through.

6. A forced-flow steam generator adapted to be heated by pressurized water or other nuclear reactor pressurized coolant, comprising elongated and vertically arranged heat exchanger means having a system of parallel straight heat exchanger tubes and a vessel having a pressure-resistant wall structure enclosing said tube system, collector means forming a steam plenum chamber in the top portion of said vessel thermally displaceable relative to said vessel, distributor means forming a plenum chamber in the bottom portion of said vessel tightly affixed to said vessel, said individual tubes extending straight vertically and free of mixing localities between said distributor means and said collector means so as to form respective communications between said two chambers, said vessel having inlet and outlet ducts communicating through said respective chambers with said tubes, said inlet and outlet ducts including an inlet duct tightly affixed to said vessel, said vessel having further inlet and outlet means defining a flow path exteriorly of said tubes through said vessel; movable packing means providing a seal between said inlet duct and said steam plenum chamber; thermally responsive means movably connecting at least one of said collector means and distributor means with said vessel wall structure; and access means in said vessel for providing access for a man to at least one of said chambers.